(12) United States Patent
Sonetaka

(10) Patent No.: US 6,487,392 B1
(45) Date of Patent: Nov. 26, 2002

(54) ASSIGN CHANNEL DISTRIBUTING SYSTEM AND DISTRIBUTING METHOD THEREFOR

(75) Inventor: Noriyoshi Sonetaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/456,074

(22) Filed: Dec. 6, 1999

(30) Foreign Application Priority Data

Dec. 7, 1998 (JP) .......................................... 10-347303

(51) Int. Cl.[7] .................................................. H04Q 7/20
(52) U.S. Cl. ...................................... 455/11.1; 455/554
(58) Field of Search ................................ 455/450, 564, 455/524, 525, 515, 560, 561, 502, 555, 554, 11.1, 517; 375/133, 134, 132; 370/330, 332, 337, 338, 350, 503, 347, 327

(56) References Cited

U.S. PATENT DOCUMENTS

| | | | | |
|---|---|---|---|---|
| 4,549,293 A | * | 10/1985 | Christian et al. | 370/327 |
| 4,937,818 A | * | 6/1990 | Sonetaka | 370/348 |
| 5,448,570 A | * | 9/1995 | Toda et al. | 370/337 |
| 5,652,752 A | * | 7/1997 | Suzuki et al. | 370/30 |
| 5,822,361 A | | 10/1998 | Nakamura et al. | 375/202 |
| 5,862,142 A | * | 1/1999 | Takiyasu et al. | 370/480 |
| 5,870,385 A | * | 2/1999 | Ahmadi et al. | 370/252 |
| 5,946,317 A | * | 8/1999 | Parkhideh | 370/410 |
| 6,031,863 A | * | 2/2000 | Jusa et al. | 375/202 |
| 6,073,016 A | * | 6/2000 | Hulthen et al. | 455/432 |
| 6,138,037 A | * | 10/2000 | Jaamies | 455/560 |

FOREIGN PATENT DOCUMENTS

| | | |
|---|---|---|
| EP | 0 621 707 | 10/1994 |
| JP | 5-206933 | 8/1993 |
| JP | 6-276126 | 9/1994 |
| JP | 7-44723 | 5/1995 |
| JP | 8-116567 | 5/1996 |
| JP | 2552931 | 8/1996 |
| JP | 9-98486 | 4/1997 |
| JP | 10-145843 | 5/1998 |

OTHER PUBLICATIONS

Kawahara in 4.2.3 Channel Arrangement of Chapter 4 of "Digital Mobile Communication", (Science Newspaper Co., Ltd.), pp. 132–136.

* cited by examiner

Primary Examiner—Dwayne Bost
Assistant Examiner—Jean A Gelin
(74) Attorney, Agent, or Firm—Sughrue Mion, PLLC

(57) ABSTRACT

On the basis of information indicating a master/slave assignment from a base station control-station, information on the channel interference levels, desired channel numbers, etc. is exchanged between a master station and each slave station, and then the master station assigns radio channels based on the information thus exchanged to the respective slave stations, thereby performing the optimum assignment of the radio channels in a radio system.

20 Claims, 9 Drawing Sheets

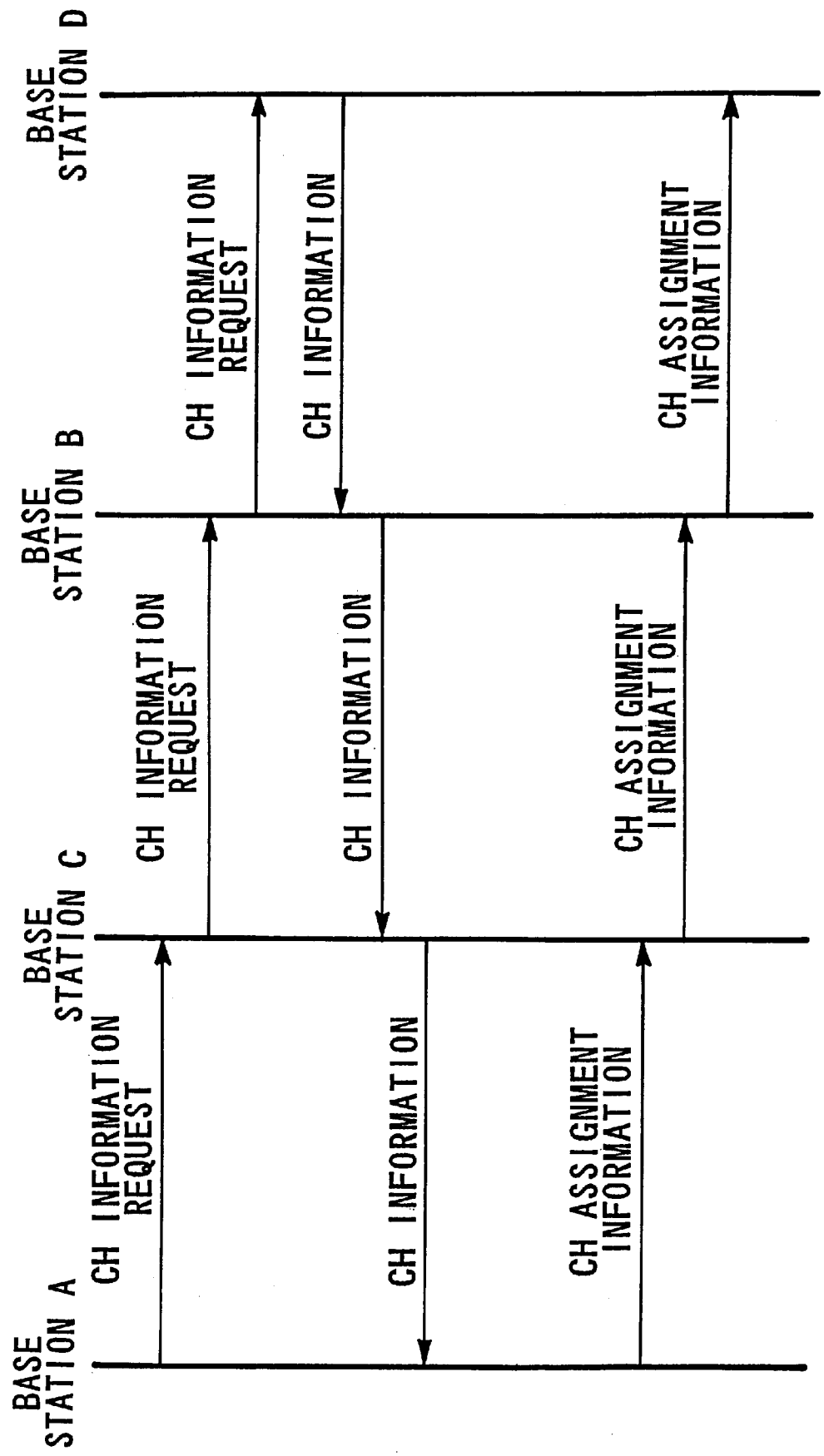

ASSIGN CHANNEL DISTRIBUTING SYSTEM AND DISTRIBUTING METHOD THEREFOR

BACKGROUND OF THE INVENTION

1. Field of the Invention

The present invention relates to assign channel distributing system and method for assigning radio channels optimally to a radio system in a system (wireless local loop) which uses a radio system comprising cellular telephones, etc. and contains general subscribers (telephones).

2. Description of the Related Art

An optimum arrangement of radio channels is an item indispensable to effectively use definite frequency resources.

As a channel arrangement system, there are known an interleave channel arrangement system or a split channel arrangement system, in which the center frequencies of respective channels are located between normal channel intervals. In these methods, it is impossible to use adjacent channels in the same cell because the spectra are overlapped between these channels. Further, even if use of adjacent cells is restricted, it suffers restriction due to interference conditions, and thus the drastic improvement of the use efficiency in frequency has not yet been achieved. However, it wold be possible to assign adjacent channels if the cells which use adjacent channels are separated from each other approximately the distance corresponding to the interval between second adjacent cells. In this case, however, the channel use efficiency is extremely lowered if the distribution is not uniform.

In order to solve these problems, there has been proposed a dynamic channel arrangement system for selecting channels which are within a fixed distance range from a cell and are not used in interference cells. However, this system has such a disadvantage that it is necessary to process information bridging over many base stations at high speed by a center station in conformity with the increase/reduction of traffic (an amount of information flowing per fixed time).

Further, there has been also proposed a distributed dynamic channel arrangement system in which each base station is provided with a priority function on channel use and the priority function is varied according to the magnitude of the interference level of each channel. However, this system has such a disadvantage that the interference relationship between the interference level measured by an individual base station and the interference level measured by other base stations is unclear and thus this system does not support timely traffic variation.

The above systems are described in more detail by Kuwahara in "4.2.3 Channel Arrangement (pp132–136) of Chapter 4 of "DIGITAL MOBILE COMMUNICATION" (Science Newspaper Co., Ltd.).

SUMMARY OF THE INVENTION

An object of the present invention is to provide an assign channel distributing system and method which can perform an optimum radio channel assignment to a radio system.

According to a first aspect of the present invention, there is provided an assign channel distributing system which comprises plural base stations which communicate with subscriber terminals, and a base station control-station for sending to the plural base stations information indicating whether each base station should serve as a master station or slave station (i.e., an assignment of a master station or a slave station to each of the base stations, and it is hereinafter referred to as "master/slave assignment).

According to a second aspect of the present invention, there is provided an assign channel distributing method which comprises a first step of performing communications between a subscriber terminal and plural base stations, and a second step of sending to the plural base stations information indicating whether each base station serves as a master station or a slave station.

According to the assign channel distributing system and method of the present invention, on the basis of the information indicating the master/slave assignment which is sent from a base station control-station to the respective base stations, the information on the channel interference level, the desired channel number, and the like is exchanged between the master station and each slave station, whereby the master station performs the radio channel assignment on the slave stations on the basis of the information on the channel interference level, the desired channel number, and the like.

BRIEF DESCRIPTION OF THE DRAWINGS

FIG. 9 is a sequence diagram showing the fourth embodiment of the assign channel distributing system according to the present invention.

DETAILED DESCRIPTION OF THE PREFERRED EMBODIMENTS

Preferred embodiments according to the present invention will be described hereunder with reference to the accompanying drawings.

First Embodiment

Figure 1:
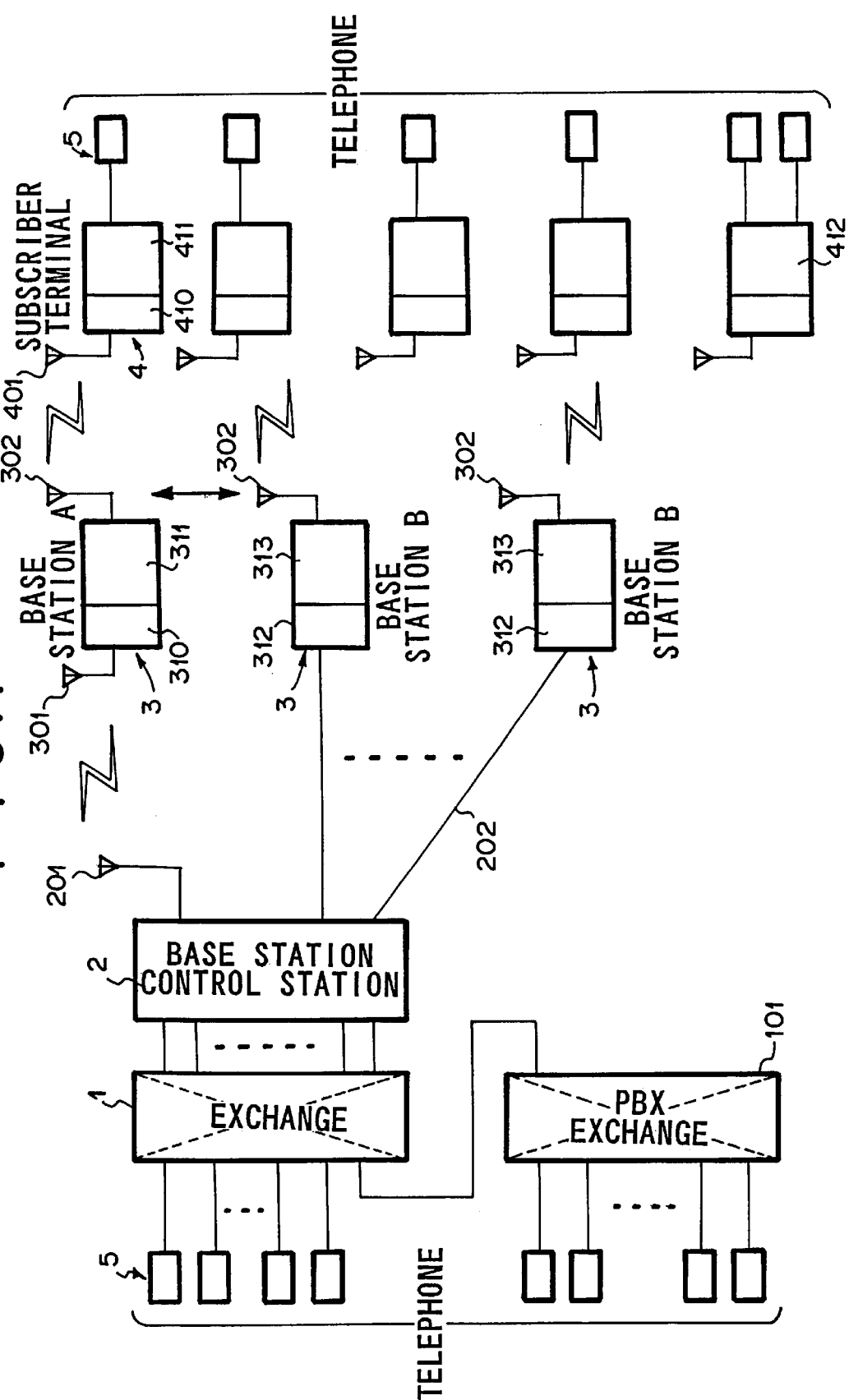
FIG. 1 is a block diagram showing a first embodiment of an assign channel distributing system according to the present invention.
Figure 2:
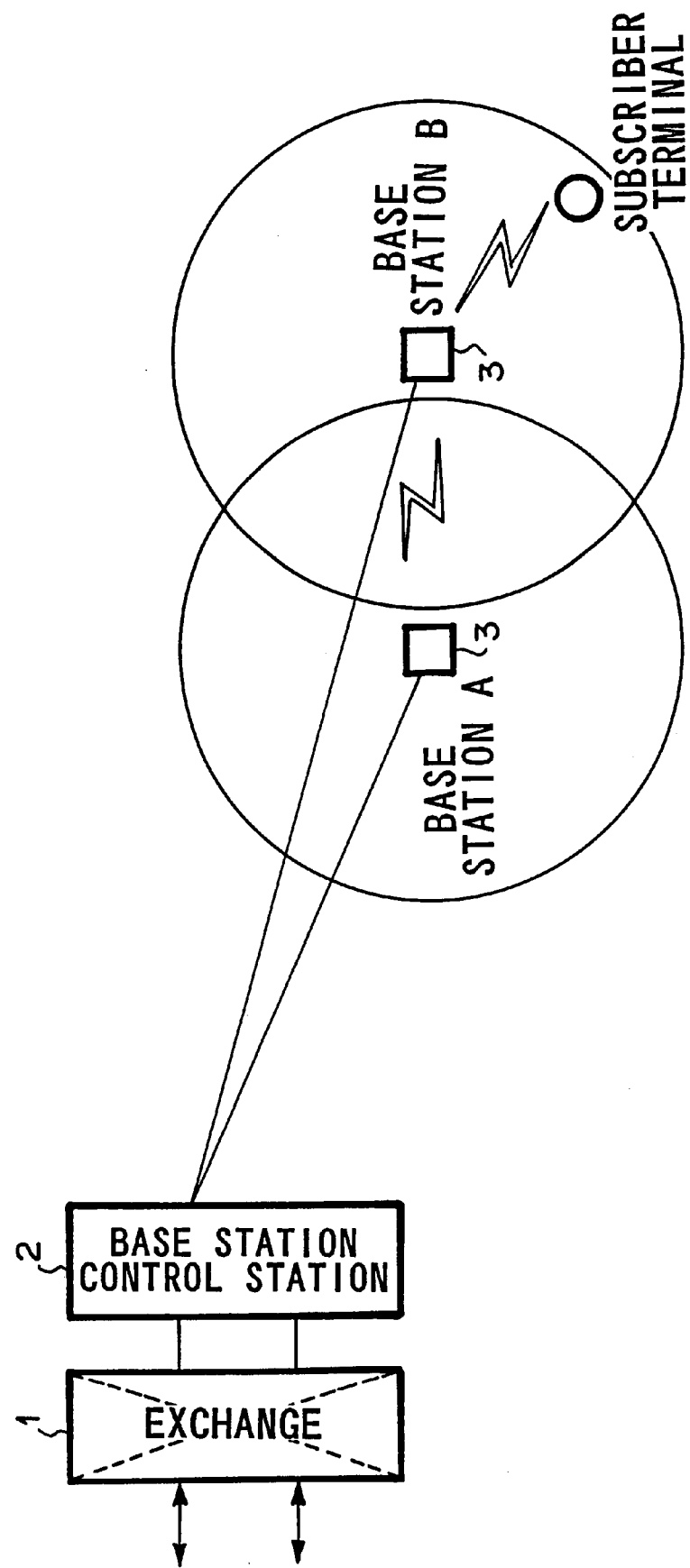
FIG. 2 is a sequence diagram showing the operation of the assign channel distributing system shown in FIG. 1.
Figure 3:
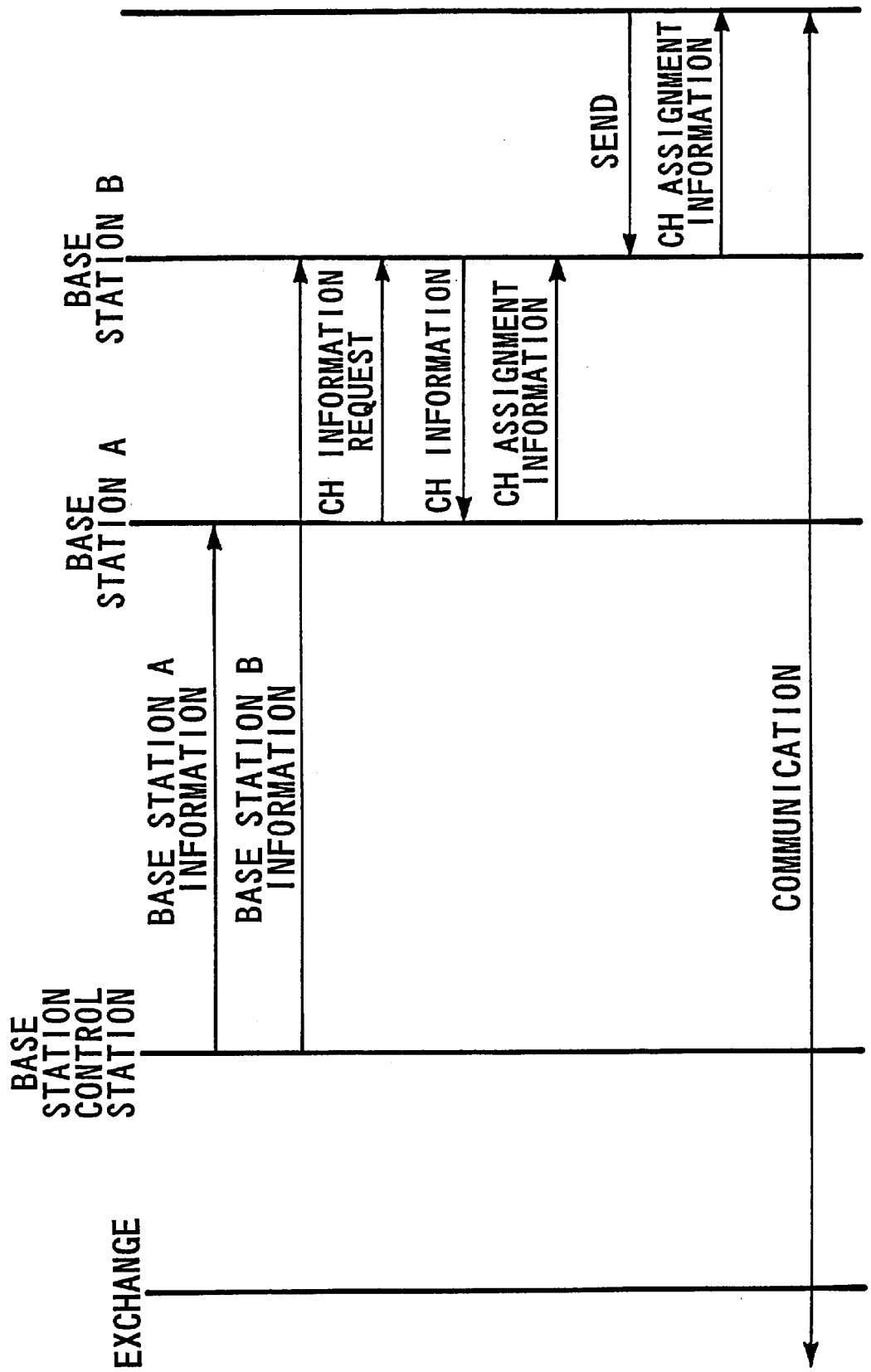
FIG. 3 is a sequence diagram showing the operation of the assign channel distributing system shown in FIG. 1.

FIG. 1 is a block diagram showing a first embodiment of an assign channel distributing system according to the present invention, and FIGS. 2 and 3 are sequence diagrams showing the operation of the assign channel distributing system shown in FIG. 1.

The assign channel distributing system shown in FIG. 1 has exchange 1 and base station control-station 2 for exchanging a radio access system. The exchange 1 is connected to a PBX (Private Branch Exchange) 101. The exchange 1 and the PBX 101 are connected to telephones 5. The base station control-station 2 is connected to base stations (A,B) 3 through antenna 201 or cable 202 containing optical fibers.

The base station (A) 3 has antennas 301, 302 and circuits 310, 311. The circuit 310 serves to receive/send radio signals from/to the base station control-station 2. The circuit 311 converts both of radio signals from the base station control-station 2 and radio signals from subscriber terminal 4. The base station (B) 3 has antenna 302 and circuits 312, 313. The circuit 312 has the same function as the circuit 311, and the circuit 313 serves to convert electrical signals sent through the cable 202 to radio signals and output the radio signals to subscriber terminal 4.

Each subscriber terminal 4 has antenna 401 and circuits 410 to 412. The antenna 401 serves to receive/send radio signals from/to each base station 3, and the circuit 410 converts electrical signals to radio signals. The circuits 411, 412 converts the radio signals from the antenna 401 to telephone interface signals. These circuits 411, 412 are connected to telephones 5.

The connection between the exchange 1 and the base station control-station 2 may be performed under a radio (wireless) condition or a wire condition.

The exchange 1 may be a private branch exchange or the like. The connection between the base station control-station 2 and the base stations (B) 3 may be performed through any medium which can perform communication transmission such as radio, optical fibers, metal wires or the like.

A point-point system or a point-multipoint system may be use as an access system between the base station control-station 2 and the base stations 3. Further, if a point-multipoint system (a point-point system is possible) is based as a multiplexing system for the connection between the base station 3 and the subscriber terminal 4, TDMA (Time Division Multiple access) system, FDMA (Frequency Division Multiple access) system, CDMA (Code Division Multiple access) system, or the like may be used. Further, as a radio access system between the base station 3 and the subscriber terminal 4 may be used GSM (Global System for Mobile Communication), AMPS (Advanced Mobile Phone Service), PDC (Personal Digital Cellular Telecommunication), PCS (Personal Communications System), DECT (Digital European Cordless Telecommunication), PHS (Personal Handy Phone System), or the like. The subscriber terminals 4 and the telephones 5 may be connected to one another in a one-to-one connection style or one-to-multi connection style.

Next, the operation of the assign channel distributing system thus constructed will be described with reference to FIGS. 2 and 3.

First, the base station control-station 2 sends to the base stations (A,B) 3 information indicating whether each base station plays a role as a master station or a slave station, and information indicating an assignment of inherent numbers to the respective base stations 3. Here, it is assumed that the base station (A) 3 serves as a master station and the base station (B) 3 serves as a slave station.

Thereafter, the base station (A) 3 serving as the master station sends a "CH information request" to the base station (B) 3 serving as the slave station. The CH information request is a signal for requesting information on channel interference level, a desired channel number, etc. which is held in the base station (B) 3 serving as the slave station.

The base station (B) 3 serving as the slave station sends this information to the base station (A) 3 serving as the master station as "CH information". On the basis of this information, the master station (A) 3 determines the radio channel arrangement (assignment) which does not affect the surroundings, and sends it as "CH assignment information" to the slave stations (B) 3.

After the above operation is finished, a call reception (receive) to the subscriber terminal 4 is performed on the basis of the arrival of a call reception signal from the exchange 1 through the base station control-station 2 at the base station (B) 3 serving as the slave station. At this time, the slave station (B) 3 assigns the radio frequency to be used to the subscriber terminal 4 on the basis of the "CH assignment information" obtained through the above sequence.

When a call is emitted from the subscriber terminal 4, a radio channel which is obtained on the basis of the "CH assignment information" as in the case of the above sequence is assigned between the subscriber terminal 4 and the base station (B) 3 serving as the slave station, and a call is connected through the slave station (B) 3, the base station control-station 2 and the exchange 1.

As described above, according to the first embodiment, on the basis of the information indicating the master/slave assignment from the base station control-station 2, the information on the channel interference levels, the desired channel numbers, etc. is exchanged between the master station (A) 3 and each slave station (B) 3, and then the master station (A) 3 assigns the radio channels on the basis of the information thus exchanged to the respective slave stations (B) 3, thereby performing the optimum assignment of the radio channels in the radio system.

Use of the above system can achieve the instantaneity of the channel assignment and the reduction of information amount which have been hitherto difficult to be achieved by the conventionally proposed centralized dynamic channel arrangement system. Furthermore, this system can also solve the disadvantages in the matching with the variation of traffic, the interconnection with control of other base stations, etc. which have been hitherto difficult to be achieved by the decentralized dynamic channel arrangement system.

Second Embodiment

Figure 4:
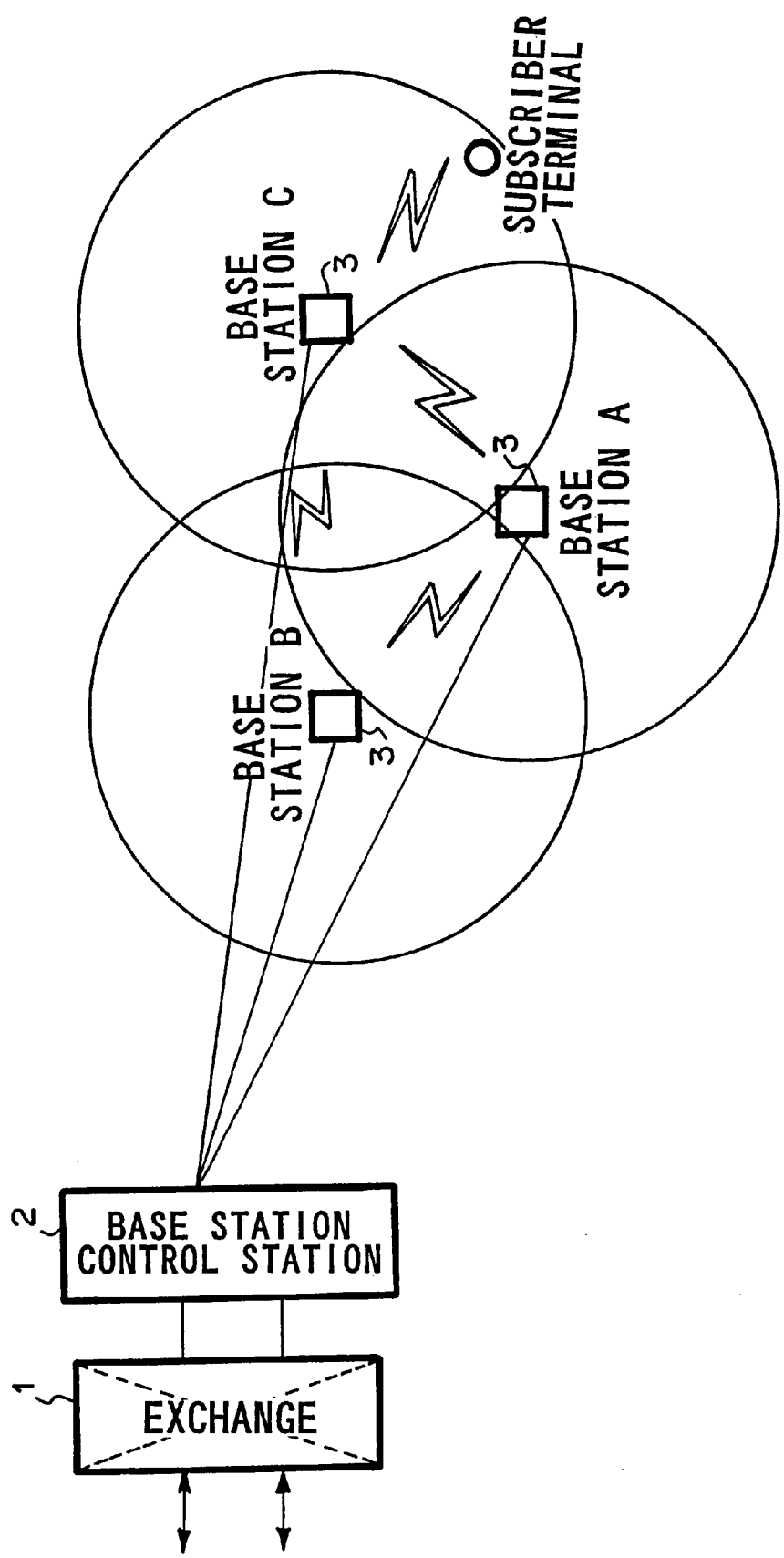
FIG. 4 is a sequence diagram showing a second embodiment of the assign channel distributing system according to the present invention.
Figure 5:
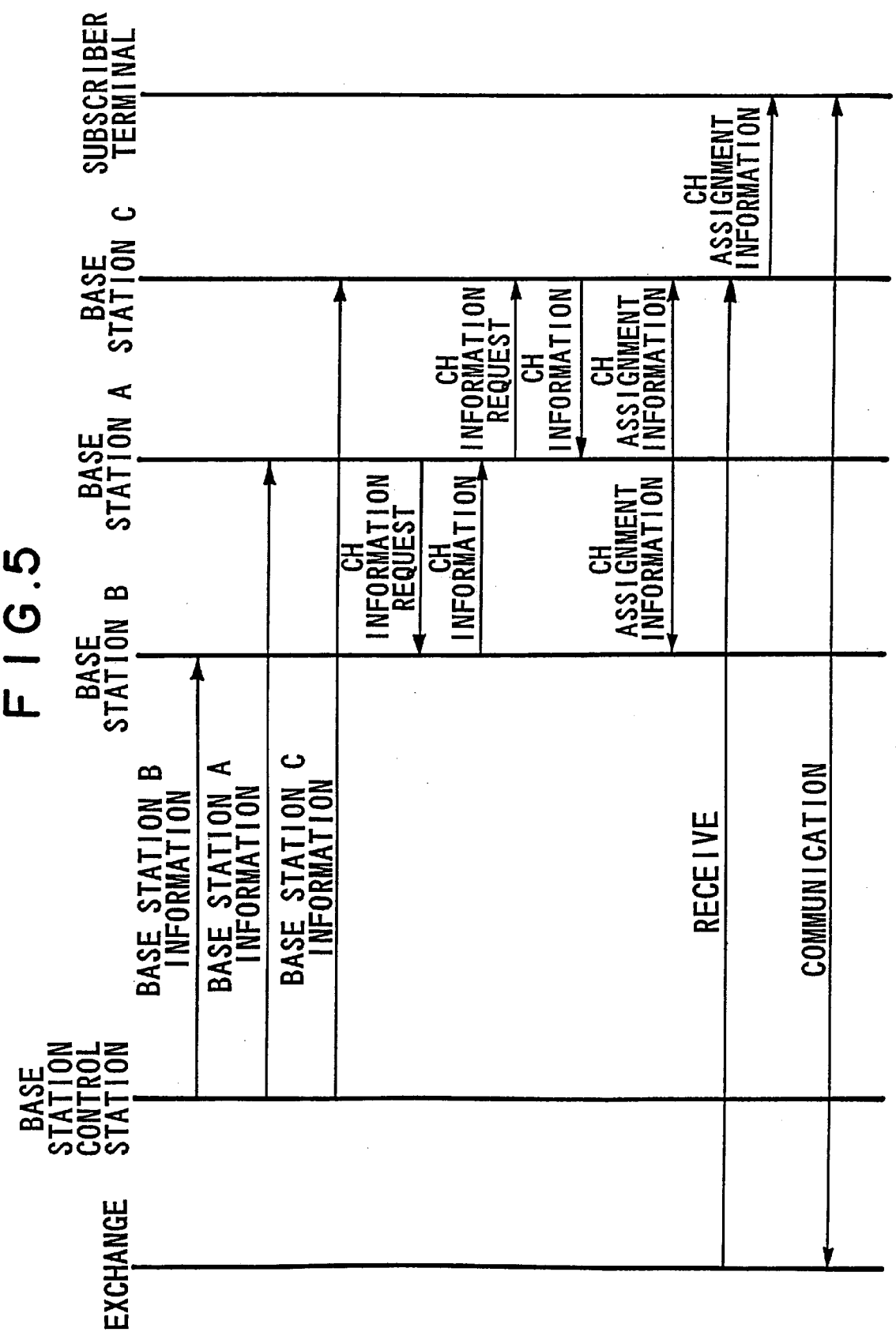
FIG. 5 is a sequence diagram showing the second embodiment of the assign channel distributing system according to the present invention.

FIGS. 4 and 5 are sequence diagrams showing a second embodiment of the assign channel distributing system according to the present invention.

In the second embodiment, a base station (A) 3 is assumed as a master station, and base stations (B,C) 3 are assumed as slave stations. That is, the base station (A) 3 sends "CH information request" to each of the base stations (B,C) 3 serving as the slave stations, and then receives "CH information" from each slave station. Thereafter, the master station (A) 3 collects information on interference level, a desired channel number, etc. from each slave station (B,C) 3, selects radio channels having no effect on the surroundings to the slave station (B,C) 3 on the basis of the information thus collected, and then sends "CH assignment information" to each of the slave station (B,C) 3, whereby an optimum channel assignment can be performed.

In this case, even when the base station (B) serving as the slave station does not know which one of the base stations (A,C) 3 is the master station, the base station (B) can specify the master station on the basis of an inherent number assigned to the base station serving as the master station. The inherent numbers assigned to the base stations may be settled so that each base station is obedient to a base station having an inherent number smaller than that of the base station concerned.

The above operation may be carried for the "CH assign" operation at any time, for example, at the start time, during an actual use period.

Third Embodiment

Figure 6:
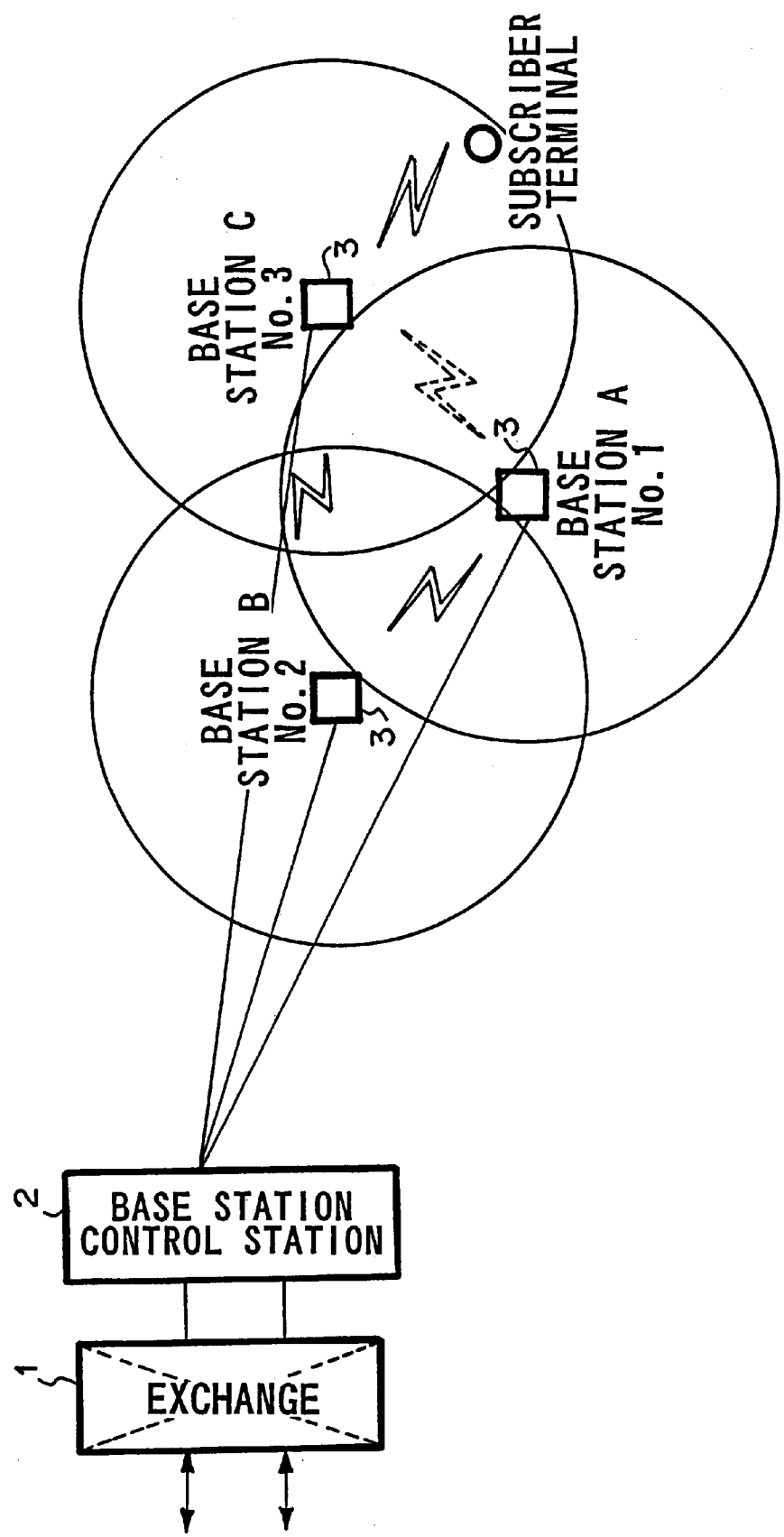
FIG. 6 is a sequence diagram showing a third embodiment of the assign channel distributing system according to the present invention.
Figure 7:
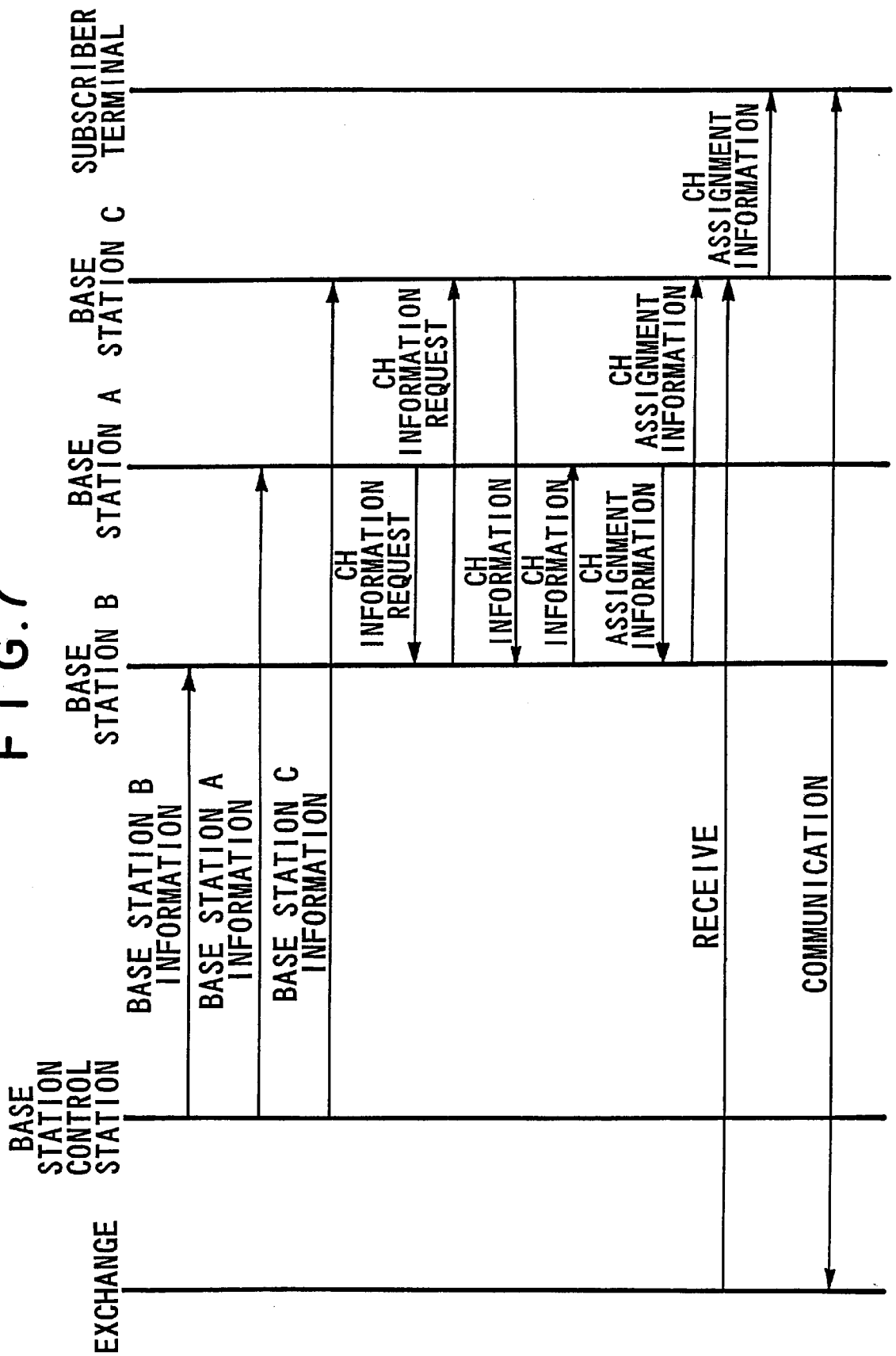
FIG. 7 is a sequence diagram showing the third embodiment of the assign channel distributing system according to the present invention.

FIGS. 6 and 7 are sequence diagrams showing a third embodiment of the assign channel distributing system according to the present invention.

In the third embodiment, even when the base station (A) 3 serving as the master station does not communicate with any one of the base stations (B,C) 3 serving as the slave station, the master station (A) 3 can communicate with the incommunicable slave station by getting relating information through any slave station other than the incommunicable slave station. In this embodiment, the base stations 3 are assumed to be provided with inherent numbers of No.1 to No.3, respectively.

Here, it is assumed that it is impossible to establish the communication between the master station (A) 3 and the slave station (C) 3. In this case, the master station (A) 3 first sends "CH information request" to the slave station (B) 3, and then the slave station (B) 3 sends "CH information request" to the slave station (C) 3. The "CH information" output from the slave station (C) 3 is sent via the slave station B(3) to the master station (A) 3. The "CH assignment information" is also sent via the slave station (B) 3 to the slave station (C) 3.

Furthermore, when the master station (A) 3 does not communicate with any one of the slave stations (B,C) 3, the above sequence may be performed on the basis of an instruction from the base station control-station 2. Even when the master station (A) 3 cannot communicate with any one of the slave stations (B,C) 3 in the course of the operation, the master station can communicate with the incommunicable slave station through the above relay communication.

Fourth Embodiment

Figure 8:
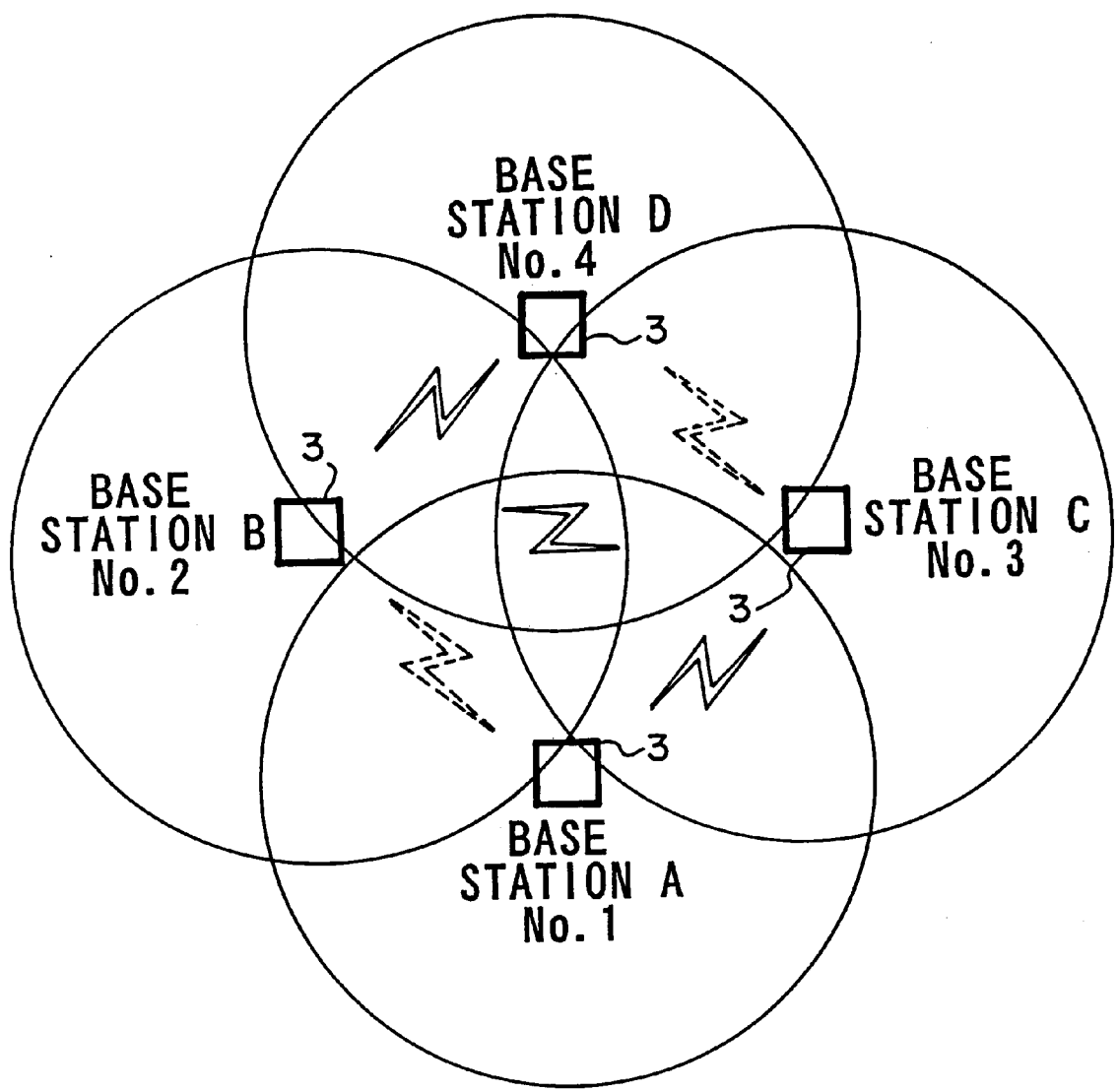
FIG. 8 is a sequence diagram showing a fourth embodiment of the assign channel distributing system according to the present invention.

FIGS. 8 and 9 are sequence diagrams showing a fourth embodiment of the assign channel distributing system according to the present invention.

The fourth embodiment contains all the cases described in the first to third embodiments. That is, when the base station (A) 3 serving as the master station cannot communicate with at least one of the base stations (B, C, D) 3 serving the slave station, the master station (A) 3 can communicate with the incommunicable slave station through the relay communication operation by the slave stations (B,C,D) 3. In this case, each slave station (B,C,D) may perform the relay communication operation on the basis of an instruction from base station control-station 2. In this embodiment, the base stations 3 are assumed to be provided with inherent numbers of No.1 to No.4, respectively.

For example, it is assumed that the base station (A:No.1) 3 can communicate with only the base station (C:No.3) 3 and the base station (C:No.3) 3 can communicate with the base station (B: No.2) 3. In this case, since the inherent number (No.2) assigned to the base station (B:No.2) 3 is larger than the inherent number (No.1) assigned to the base station (A:No.1) 3, the base station (C:No.3) 3 can perform the relay communication with the base station (B:No.2) 3 with setting the base station (A:No.1) as the master station. If the base station (A:No.1) 3 is beforehand known as the master station, the above operation is unnecessary.

Further, when the base station (B:No.2) 3 can communicate with both the base station (C:No.3) 3 and the base station (D:No.4) 3, the base station (B:No.2) 3 can perform the relay communication with the base station (D:No.4) with setting as a master station the base station (C:No.3) whose inherent number is smaller than the inherent number of the base station (D:No.4).

Still further, when the base station (A:No.1) 3 can communicate with only the base station (C:No.3) 3 and the base station (C:No.3) 3 can communicate with both the base station (B:No.2) 3 and the base station (D:No.4) 3, the base station (C:No.3) 3 performs the relay communication operation in the same way as described above. The relay communication operation of the base station (C:No.3) 3 may be carried out on the basis of an instruction from the base station control-station 2.

According to the assign channel distributing system and method of the present invention, on the basis of the information indicating the master/slave assignment from the base station control-station, the information on the channel interference levels, the desired channel numbers, and the like is exchanged between the master station and each slave station, and then the master station assigns the radio channels based on the information thus exchanged to the respective slave stations, thereby performing the optimum assignment of the radio channels in the radio system.

What is claimed is:

1. An assign channel distributing system comprising:
   plural base stations which communicate with subscriber terminals; and
   a base station control-station, coupled between said plural base stations and said subscriber terminals, that sends information to said plural base stations, said information indicating whether each of said base stations should serve as a master station or a slave station.

2. The assign channel distribution system as claimed in claim 1, wherein the base station serving as the master station sends a CH (channel) information request to one or more other base stations serving as the slave stations and receives as CH information, information which is held in said one or more base stations, and then sends to said one or more base stations CH assignment information for determining an arrangement of radio channels which do not affect the surroundings.

3. The assign channel distributing system as claimed in claim 1, wherein said information to be sent from said base station control-station to said base stations contains inherent numbers indicating a master/slave assignment to said base stations.

4. The assign channel distributing system as claimed in claim 2, wherein said CH information request is a signal for requesting information that contains a channel interference level and a desired channel number, which are held in each base station serving as said slave station.

5. The assign channel distributing system as claimed in claim 2, wherein each base station serving as said slave station assigns a radio frequency to be used to a subscriber terminal on the basis of the CH assignment information.

6. The assign channel distributing system as claimed in claim 3, wherein each base station serving as said slave station identifies said base station serving as said master station based on one of said inherent numbers thereof.

7. The assign channel distributing system as claimed in claim 1, wherein if one of the base stations serving as the master station cannot communicate directly with at least one of the base stations serving as the slave station, said master station communicates indirectly with the at least one of the base stations serving as the slave station by relaying through another of the base stations serving as the slave station with which said master station can communicate directly.

8. The assign channel distributing system as claimed in claim 7, wherein the relay communication is performed based on an instruction from said base station control-station.

9. The system of claim 1, wherein said subscriber terminals comprise telecommunications devices.

10. The system of claim 1, wherein said base stations are coupled with said subscriber terminals via anyone of wireless and wireline links.

11. The system of claim 1, further comprising an exchange coupled between said base station control-station and telephones.

12. An assign channel distributing method comprising:

a first step of performing communications between a subscriber terminal and plural base stations; and a second step of sending said plural base stations information indicating whether each base station serves as a master station or a slave station, wherein said second step is performed by a base station control-station coupled with said plural base stations.

13. The assign channel distributing method as claimed in claim 12, wherein said first step comprises sending a CH information request from the base station serving as the master station to at least one of said plural base stations serving as at least one slave station, sending information held in said at least one slave station as CH information to said master station, and then sending from said master station to said at least one slave station CH assignment information for determining a radio channel assignment which does not affect the surroundings.

14. The assign channel distributing method as claimed in claim 12, wherein said second step comprises sending inherent numbers indicating a master/slave assignment to said base stations.

15. The assign channel distributing method as claimed in claim 13, wherein said second step comprises sending inherent numbers indicating the master/slave assignment to said base stations.

16. The assign channel distributing method as claimed in claim 13, wherein said communication step comprises requesting information that contains channel interference level and a desired channel number, which are held in the at least one of the base stations serving as said slave station.

17. The assign channel distributing method as claimed in claim 13, wherein said first step comprises assigning a radio frequency to be used to said subscriber terminal based on said CH assignment information.

18. The assign channel distributing method as claimed in claim 15, wherein said communication step comprises identifying said base station serving as said master station based on said inherent number.

19. The assign channel distributing method as claimed in claim 12, wherein said first step comprises:

when one of the base stations serving as the master station cannot directly communicate with at least one of the base stations serving as the slave station, said master station communicates indirectly with the slave station by relaying through another one of the base stations serving as the slave station with which said master station can communicate directly.

20. The method of claim 12, wherein communication with said subscriber terminal comprises communication with a telecommunications device.

\* \* \* \* \*